United States Patent
Lewis et al.

[11] Patent Number: 5,147,248
[45] Date of Patent: Sep. 15, 1992

[54] POWER TRANSMISSION SHEAVE AND METHOD OF MANUFACTURING THE SAME

[75] Inventors: Michael L. Lewis; Paul G. Kurre; George B. Day, all of Mason; Daniel G Fannin, Lewis; Roland C. Thomas, Mason, all of Ky.

[73] Assignee: Emerson Electric Co., St. Louis, Mo.

[21] Appl. No.: 749,673

[22] Filed: Aug. 26, 1991

[51] Int. Cl.$^5$ ............................................. F16H 55/49
[52] U.S. Cl. ...................................... 474/166; 29/892
[58] Field of Search ................................ 474/168-170, 474/174, 166; 29/892-893

[56] References Cited

U.S. PATENT DOCUMENTS 2,471,969  5/1949  Meyer ........................... 474/167 X
3,186,247  6/1965  Burrell ............................ 474/174

Primary Examiner—Thuy M. Bui
Attorney, Agent, or Firm—Polster, Lieder, Woodruff & Lucchesi

[57] ABSTRACT

A power transmission sheave and method of manufacturing such sheave wherein the groove of the sheave incorporates critical dimensions to make it adaptable for use with any of several commercially known grooved sheaves and belts therefor, the sheaves having differing proximal critical dimensions including those relating to the side wall angles of slope, the top and bottom widths and the normal groove depths.

15 Claims, 1 Drawing Sheet

POWER TRANSMISSION SHEAVE AND METHOD OF MANUFACTURING THE SAME

BACKGROUND OF THE INVENTION

The present invention relates to belt associated power transmission apparatus and more particularly to an improved power transmission sheave of the grooved rim type to be associated with anyone of several preselected types of sheaves and drive belts and a method of manufacturing such an improved sheave.

Various types of grooved metal sheaves of cast iron, die cast and formed steel are known in the power transmission art, these different sheave types having different properties for different power transmission functions, each sheave type having a specific type of belt to be associated therewith in a power transmission assembly. Among the several differing properties of the varying sheave types are the material used, the hub and bushing type, the sheave diameter size, the angle of slope of the grooved side walls, the top and bottom widths of the groove and the groove depth. These properties have been important factors in arriving at the different and numerous commercial sheave types, including such well known single groove sheaves commonly known in the power transmission industry as the "A", the "B", the "5V", the "4L" and the "5L" sheaves, each of which is associated with an endless power transmission belt of a specific type. As will be discussed more fully hereinafter, these several sheave types, as well as the specific endless belts associated therewith, differ from each other in their above discussed physical properties. Although several organizations have established a certain uniformity in the angle of groove wall slope, such as the 36° angle of groove wall slope adopted by the Society of Automotive Engineers (SAE) and the Goodyear Tire and Rubber Company range of 36° to 42° angle of groove wall slope, it generally has been the common practice to use a specifically designed sheave and endless drive belt for association with each sheave type and to insure that both drive and driven sheaves are of a compatible similar type. It also has been generally recognized that departure from such practice in the past could lead to undesirable problems in power transmission efficiencies and to power losses, poor belt performance, poor belt body and belt cord wear and undesirable belt-groove bottoming with some of the associated undesirable problems aforediscussed concomitant with such undesirable belt bottoming.

The present invention, recognizing the past undesirable problems associated with proper sheave and belt selection from the many types of belts and sheaves commercially available and also recognizing the undesirable problems associated with the comparatively extensive stocking and possible improper belt and sheave matching, provides a unique and novel sheave structure and method of manufacture which greatly simplifies sheave stocking and selection, assuring commonality and compatibility of usage in place of or with any one of the several above recited types of sheaves and associated belts therefore over a broad horsepower range without incurring the above discussed undesirable problems which could arise through possible mismatch. In addition, the present invention provides a unique sheave which allows for greatly increased belt life without belt bottoming and with increased heat dissipation between belt and sheave. Moreover, the present invention recognizes and resolves a need for providing a single type of sheave which includes recognized critical properties of increased top groove width and increased groove depth, a preselected angle of groove side wall slope and groove bottom width, which properties satisfy usage with belts and sheaves of varying preselected types, each of which types is generally well known for use in the power transmission arts in a comparatively more restricted environment.

Various other features of the present invention will become obvious to one skilled in the art upon reading the disclosure set forth herein.

BRIEF SUMMARY OF THE INVENTION

More particularly the present invention provides an improved sheave having at least one groove adaptable to any one of a plurality of commercially available grooved sheaves and to any one of select specific V-belts, each associated with at least one of such commercially known grooved sheaves, including the grooved sheaves commonly and commercially designated as the types "A", "B", "5V", "4L" and "5L" with each of such commercially available grooved sheaves having differing angles of groove wall slope, differing groove top and differing groove bottom widths and differing groove depths measured normally between top and bottom groove widths comprising: a sheave having at least one groove having critical dimensions including a side wall angle of slope range from the top of the groove wall of the sheave to the bottom of the groove wall of the sheave in a range of 34° to 42°, a top groove width measuring in a range of 0.619 to 0.656 inches, a bottom groove width measuring in a range of 0.139 to 0.231 inches and a minimum groove depth measured substantially normally from top to bottom groove widths in the amount of 0.645 inches. In addition, the present invention provides a method of making an intermutual belt associated grooved sleave adaptable for common associated usage with any one of a number of preselected types of sheaves and associated endless belts for power transmission comprising: preselecting a number or grooved sheaves commonly utilized in power transmission having different, but proximal sheave groove critical dimensions including groove side wall angles of slope measured from groove top to groove bottom, top and bottom groove widths and groove depth measured normally from top groove width to bottom groove width; determining the critical dimensions for the intermutual grooved sheave from a mathematical averaging and empirical testing of each of such above critical dimensions of the preselected sheaves; and, forming the intermutual grooved sheave to incorporate the determined critical dimensions. In addition, the present invention further includes novel selection and conformation steps to insure top width groove engagement of the upper portion of a belt adjacent the belt core and to insure that the belt bottom is preselectively spaced above the bottom width of the groove during power operations.

It is to be understood that various changes can be made by one skilled in the art in one or more of the several parts of the apparatus disclosed herein and in one or more of the several steps of the method disclosed herein without departing from the scope or spirit of the present invention.

BRIEF DESCRIPTION OF THE DRAWING

Referring to the drawing, which discloses one advantageous embodiment of the present invention.

DETAILED DESCRIPTION OF THE DRAWING

Figure 1:
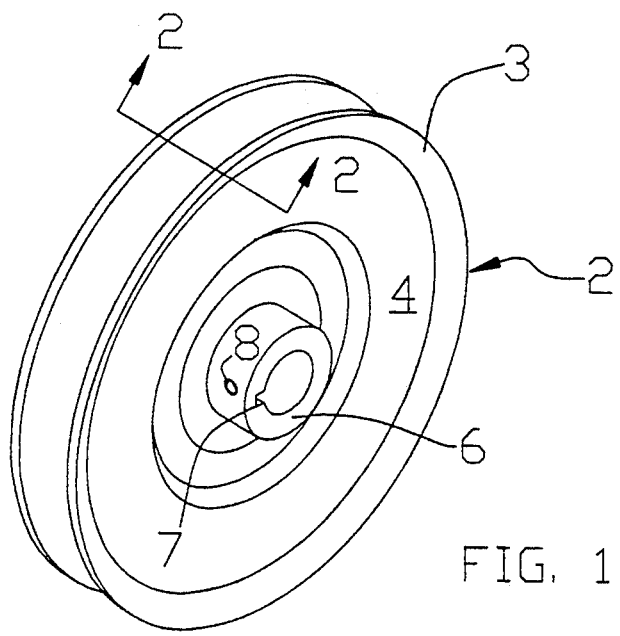
FIG. 1 is a perspective view of a typical single groove sheave which incorporates the critical dimensions of the present invention.

As can be seen in FIG. 1 of the drawings; a typical single groove sheave 2 is disclosed which can incorporate the recognized novel critical dimensions of the present invention. Sheave 2 includes a single grooved rim portion 3, a body portion 4, which can be solid, ribbed or spidered form, and a centrally disposed, internally keyed hub portion 6 which includes a spline receiving internal key or slot 7 to receive the keyed spline associated with a drive or driven shaft (not shown) and a set screw 8 to lock the sheave from sliding movement along the shaft. Sheave 2 can be formed in any one of several known ways, including different forms of casting, such as sand casting or molding and can be a suitable material such as cast iron, steel, powdered metal or even a suitable plastic compound.

Figure 2:
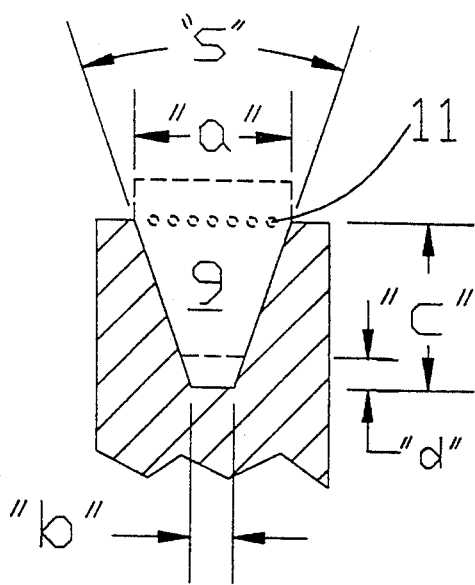
FIG. 2 is an enlarged cross-sectional view of the single groove of the sheave of FIG. 1, taken in a plane through line 2—2 of FIG. 1, disclosing by alphabetical symbols four of the dimensions contemplated by the present invention with a specifically selected belt and its cord being shown in phantom and the spacing between belt and groove bottoms also shown by alphabetical symbol; and, FIG. 3 is a cross-sectional view of a typical specifically selected endless belt which can be associated with the groove of FIG. 2, the cross-sectional view being so positioned with respect to the cross-sectional groove of FIG. 2, to further illustrate the desired operating positioning of the the belt within the groove.
Figure 3:
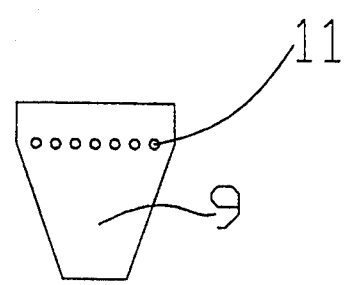

Referring to FIG. 2 of the drawing, which discloses an enlarged cross-section of the grooved rim portion 3 of sheave 2 of FIG. 1, the inventively recognized critical dimensions from which the novel critical dimensions of the single groove sheave of the present invention are designated in this figure by alphabetic reference symbols. The symbol "s" designates the angle of a groove side wall slope. The symbol "a" designates the top or width of a groove. The symbol "b" designates the bottom width of a groove. And, the symbol "c" designates the distance measured normally from the top to the bottom widths of a groove or the depth of a groove.

In accordance with the present invention these indicated dimensions as identified by the symbols "s", "a", "b", and "c" were recognized as being critical in arriving at the novel sheave which satisfactorily serves in power transmission systems that call for any one of several commonly identified single groove sheaves of certain recognized critical dimensions and the appropriately accompanying endless belt specifically designated for the grooved sheave in use. It has been particularly noted in carrying out the present invention, that the identified critical dimensions of each of certain select single groove sheaves usefully serves as a basis for arriving at the critical dimensions of the inventive grooved sheave. The inventive grooved sheave has such unique dimensional and functional properties that it can be utilized satisfactorily in the same operational environments or, in other words, operationally substituted for any one of the certain identified and select single groove sheaves along with each such selected grooved sheaves previously specified associated endless belt. These identified and select single groove sheaves were recognized as being a group of several commonly used sheaves generally known and commercially referred to in the art as the "A" sheave, the "B" sheave, the "5V" sheave, the "4L" sheave and the "5L" sheave. In accordance with the present invention it has been recognized that this commonly used group of commonly known grooved sheaves shared differing, but yet proximal dimensions which dimensions have been recognized to be critical ones in arriving at the novel and critical dimensional ranges of a single groove sheave of the present invention. To more fully comprehend and appreciate the critical and novel nature of applicant's dimensions, the recognized significant dimensions of the preselected group of five select single groove sheaves commonly known and utilized in the art, are below set forth in a matrix form, along with the arrived at critical broad and preferred ranges of the inventive single groove sheave. The above mentioned vertically disposed, alphabetical symbols "s", "a", "b" and "c" serve to indicate the critical dimensions in degrees and inches for the grooved sheaves. The symbols $I^B$ and $I^P$ indicate the inventive sheave dimension range, $I^B$ designating the broadly accepted range of dimensions for the inventive grooved sheave and $I^P$ designating the preferred range of dimensions for the grooved inventive sheave. The certain select group of commercial sheave dimensions, as abovediscussed, are designated by symbols, "A", "B", "5V", "4L" and "5L".

| Dimension | $I_B$ (range) | $I^P$ | "A" | "B" | "5V" | "4L" | "5L" |
|---|---|---|---|---|---|---|---|
| "s" slope | 34°–42° | 37°–39° | 33.67°–38.33° | 33.67°–38.33° | 37.75°–42.25° | 29.67°–38.33° | 29.67°–38.33° |
| "a" t. width | 0.619–0.656 | 0.625–0.656 | 0.489–0.509 | 0.631–0.056 | 0.595–0.605 | 0.481–0.500 | 0.621–0.640 |
| "b" b. width | 0.139–0.231 | 0.174–0.197 | 0.169–0.231 | 0.249–0.323 | 0.139–0.202 | 0.141–0.237 | 0.218–0.329 |
| "c" depth (minimum) | 0.645 Min. | 0.655 Min. | 0.460 Min. | 0.550 Min. | 0.590 Min. | 0.490 Min. | 0.580 Min. |

The critical dimension ranges set forth above as "s", "a", "b" and "c" for the selected commercial sheave dimensions designated "A", "B", "5V", "4L" and "5L" are applicable to grooved sheaves having a pitch diameter measuring from a minimal number of two (2) inches to at least up to grooved sheaves having a pitch diameter of twenty-eight inches (28") and possibly as great as 60 inches (60") or even greater depending upon manufacturing capability, with the inventive grooved sheave ranges applying to grooved sheaves in at least a similar pitch diameter range (and possibly even a greater pitch diameter) and falling within the determined critical broad dimensional ranges in accordance with the invention and as stated under "$I^B$" and preferably or advantageously falling with the determined critical preferred dimensional ranges in accordance with the invention and as stated under "$I^P$". These critical dimensional inventive ranges as set forth above were determined through mathematical calculations based on the known critical dimension ranges for the five commonly known sheave types "A", "B", "5V", "4L" and "5L" ranges, as set forth in the above table, utilizing mean and arithmetical averaging supplemented by empirical data gathered from numerous test data collected on experimental sheaves. It is to be noted that, in accordance with the present invention and the critical dimension ranges for the inventive sheave groove, there will be a clearance "d" between the bottom face of the groove and the bottom face of a specifically selected belt 9 associated therewith, which belt 9 can be anyone of the specific belts normally and previously associated with the certain commonly used grooved sheaves, "A", "B", "5V", "4L" and "5L". Advantageously, this clearance will be a minimum of 0.175 inches, but this spacing measurement can vary in accordance with the specific dimensions of the groove and then particular belt associated therewith. In this regard, and in accordance with one feature of the present invention, it has been found important that the belt bottom face be in spaced relation from the groove bottom face and that the intermediate plane of the belt cord 11 be positioned adjacent the top corners of the top width of the groove which determining corners, along with the bottom width determining corners, can advantageously be rounded with a 1/32 inch radius. It is to be noted that, in accordance with still another feature of the present invention, the inventive single groove sheave incorporating dimensions within the critical ranges for either $I^B$ or $I^P$ when associated with another single groove sheave of like type or with a single groove sheave from the commonly known group "A", "B", "5V", "4L" or "5L", should have the respective sheave centers of rotation properly spaced and in accurate alignment with a maximum misalignment allowance of $\frac{1}{2}°$ being suggested to avoid any undesirable belt life reduction.

Thus, in accordance with the present invention, a novel sheave and method of making the same is provided with a sheave groove having a set of recognized critical dimensions that allows the inventive sheave to be subtitled or used in association with any one of a certain select group of sheaves, each having different, yet proximal sets of critical dimensions compatible with the inventive groove, the novel sheave having an extended operating life and efficient operating performance characteristics.

The invention claimed is:

1. An improved sheave having at least one groove adaptable to any one of a plurality of commercially available sheave grooves and to any one of select, specific V-belts, each associated with at least one of said commercially known grooved sheaves, including the grooved sheaves commonly used and commercially designated as types "A", "B", "5V", "4L" AND "5L" with each of said commercially available grooved sheaves having differing angles of groove wall slope, differing groove top and differing groove bottom widths and differing groove depths measured normally between top and bottom groove widths comprising; a sheave having at least one groove having critical dimensions including a side wall angle of slope range from the top of the groove wall of the sheave to the bottom of the groove wall of the sheave in a range of 34° to 42°, a top groove width measuring in a range of 0.619 to 0.656 inches, a bottom groove width measuring in a range of 0.139 to 0.231 inches and a minimum groove depth measuring substantially normally from top to bottom groove widths in an amount of 0.645 inches.

2. The improved sheave having at least one groove of claim 1, said groove advantageously having critical dimensional ranges including a side angle of slope range from the top of the groove of the sheave to the bottom of the groove of the sheave in a range of 37.00° to 39.00°, a top groove width in a range of 0.625 to 0.656 inches, a bottom groove width in a range of 0.174 to 0.197 inches and a minimum normal groove depth in an amount of 0.655 inches.

3. The improved single groove belt sheave of claim 1, said sheave being of cast iron.

4. The improved single groove belt sheave of claim 1, said sheave being of steel.

5. The improved single groove sheave of claim 1, said sheave being of powdered metal.

6. The improved single groove sheave of claim 1, said sheave being a plastic compound.

7. The improved single groove sheave of claim 1, said groove being of sufficient depth wherein any one of said select specific being of sufficient depth wherein any one of said select specific V-belts received thereby, has said belt bottom face spaced from the face of the bottom of said groove with the cord belt falling within a plane passing through the top width of said groove.

8. The improved single groove sheave of claim 7, wherein said V-belt received by said groove has said belt bottom face spaced from the bottom face of said groove, a minimum of 0.175 inches.

9. The improved single groove sheave of claim 1, said sheave having a pitch diameter in a range of approximately two (2) to at least twenty-eight (28) inches.

10. A method of making an intermutual belt receiving grooved sheave adaptable for common usage with any one of a number of preselected types of grooved sheaves and specific belt sets for such sheaves for power transmission comprising;
    preselecting a number of grooved sheaves commonly utilized in power transmission having different proximal sheave groove critical dimensions including groove side wall angles of slope measured from groove top to groove bottom, top and bottom widths and normal groove depth;
    determining said critical dimensions for said intermutual belt receiving grooved sheave from an averaging of said critical dimensions of said preselected sheaves; and, forming said intermutual belt receiving grooved sleave to incorporate said determined critical dimensions.

11. The method of making an intermutual grooved belt receiving sheave of claim 10, including incorporating in the top groove width critical dimension an appropriate dimensional allowance to insure that the cord portion of drive belts to be used therewith, engage the groove adjacent the top width of said groove.

12. The method of making an intermutual grooved belt receiving sheave of claim 10, including incorporating in the normal groove depth critical dimension an appropriate dimensional allowance to insure that the bottom face of selected drive belts to be used therewith are preselectively spaced above the bottom width face of said groove.

13. The method of making an intermutual grooved belt receiving sheave of claim 10, including incorporating in the top horizontal groove width critical dimension an appropriate dimensional allowance to insure that the cord portion of said select drive belts to be used with said preselected sheaves engage the groove adjacent the top width of said groove and incorporating an appropriate dimensional allowance to insure that the bottom face of said select drive belts are preselectively spaced above the bottom width face of said groove.

14. The method of making an intermutual grooved belt receiving sheave of claim 10, wherein said sheave is formed by metal casting.

15. The method of claim 14, said casting step being sand casting.

* * * * *